US008902280B2

(12) United States Patent
Robinson et al.

(10) Patent No.: US 8,902,280 B2
(45) Date of Patent: Dec. 2, 2014

(54) COMMUNICATING VISUAL REPRESENTATIONS IN VIRTUAL COLLABORATION SYSTEMS

(75) Inventors: Ian N. Robinson, Pebble Beach, CA (US); Daniel G. Gelb, Redwood City, CA (US); Kar-Han Tan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 349 days.

(21) Appl. No.: 13/259,762

(22) PCT Filed: Apr. 16, 2009

(86) PCT No.: PCT/US2009/040870
§ 371 (c)(1),
(2), (4) Date: Sep. 23, 2011

(87) PCT Pub. No.: WO2010/120304
PCT Pub. Date: Oct. 21, 2010

(65) Prior Publication Data
US 2012/0026275 A1    Feb. 2, 2012

(51) Int. Cl.
*H04N 7/14*     (2006.01)
*H04L 12/18*    (2006.01)
*H04N 7/15*     (2006.01)
*H04M 3/56*     (2006.01)

(52) U.S. Cl.
CPC ............... *H04N 7/15* (2013.01); *H04M 3/567* (2013.01); *H04N 7/142* (2013.01); *H04L 12/1827* (2013.01)

USPC ............ 348/14.1; 348/14.03; 348/14.15; 345/619; 345/441; 715/716

(58) Field of Classification Search
USPC ............. 348/14.01–14.16; 370/259–271, 370/351–357; 709/201–207, 217–248
See application file for complete search history.

(56) References Cited

U.S. PATENT DOCUMENTS

| 4,400,724 | A  | * | 8/1983  | Fields ........................ 348/14.1 |
| 5,239,373 | A  | * | 8/1993  | Tang et al. ................ 348/14.01 |
| 6,829,394 | B2 | * | 12/2004 | Hiramatsu .................... 382/291 |
| 7,034,807 | B2 | * | 4/2006  | Maggioni ..................... 345/173 |
| 7,091,949 | B2 | * | 8/2006  | Hansen ........................ 345/158 |
| 7,119,788 | B2 | * | 10/2006 | Gomi et al. .................. 345/156 |
| 7,770,115 | B2 | * | 8/2010  | Gallmeier et al. ............ 715/716 |
| 2003/0007104 | A1 | * | 1/2003 | Hoshino et al. ............... 348/734 |
| 2004/0085522 | A1 | * | 5/2004 | Honig et al. .................. 353/121 |
| 2005/0260986 | A1 | * | 11/2005 | Sun et al. ..................... 455/433 |

(Continued)

*Primary Examiner* — Hemant Patel
(74) *Attorney, Agent, or Firm* — Walter W. Karnstein; Kolisch Hartwell PC

(57) ABSTRACT

Systems and methods of visually indicating one or more gestures of a user of a node (22) in the content of a media stream (24) are disclosed. A node (22) configured to transmit a media stream (24) having content to one or more other nodes (22) includes a screen configured to display the content of the media stream, a media device (36) configured to capture an image of one or more gestures of the user of the node (22), wherein the one or more gestures are adjacent to the screen and the media device (36) is positioned to capture the image without capturing more than a peripheral view of the screen in that image; a media analyzer (38) configured to generate a visual representation of the captured one or more gestures; and a compositer (40) configured to composite the visual representation of the captured one or more gestures with the content of the media stream (24).

15 Claims, 3 Drawing Sheets

(56) References Cited

U.S. PATENT DOCUMENTS

| | | | |
|---|---|---|---|
| 2006/0170874 A1* | 8/2006 | Yumiki et al. | 353/42 |
| 2007/0115254 A1* | 5/2007 | Wu | 345/156 |
| 2008/0109724 A1 | 5/2008 | Gallmeier et al. | |
| 2010/0141578 A1* | 6/2010 | Horiuchi et al. | 345/158 |

* cited by examiner

COMMUNICATING VISUAL REPRESENTATIONS IN VIRTUAL COLLABORATION SYSTEMS

BACKGROUND

Videoconferencing and other forms of virtual collaboration allow the real-time exchange or sharing of video, audio, and/or other content or data among systems in remote locations. That real-time exchange of data may occur over a computer network in the form of streaming video and/or audio data.

In many videoconferencing systems, media streams that include video and/or audio of the participants are displayed separately from media streams that include shared content, such as electronic documents, visual representations of objects, and/or other audiovisual data. Participants interact with that shared content by using peripheral devices, such as a mouse, keyboard, etc. Typically, any gestures made by the participants without a peripheral device to highlight one or more portions of the shared content are not visible.

DETAILED DESCRIPTION

The present illustrative methods and systems may be adapted to manage shared content in virtual collaboration systems. Specifically, the present illustrative systems and methods may, among other things, allow users of those systems to visually indicate one or more of their gestures in the content of one or more media streams. Further details of the present illustrative virtual collaboration systems and methods will be provided below.

As used in the present disclosure and in the appended claims, the terms "media" and "content" are defined to include text, video, sound, images, data, and/or any other information that may be transmitted over a computer network.

Additionally, as used in the present disclosure and in the appended claims, the term "node" is defined to include any system with one or more components configured to receive, present, and/or transmit media with a remote system directly and/or through a network. Suitable node systems may include videoconferencing studio(s), computer system(s), personal computer(s), notebook or laptop computer(s), personal digital assistant(s) (PDAs), or any combination of the previously mentioned or similar devices capable of connecting to and/or transmitting data over a network.

Similarly, as used in the present disclosure and in the appended claims, the term "event" is defined to include any designated time and/or virtual meeting place providing systems a framework to exchange information. An event allows at least one node to transmit and receive media information and/or media streams. An event also may be referred to as a "session."

Moreover, as used in the present illustrative disclosure, the terms "subsystem" and "module" may include any number of hardware, software, firmware components, or any combination thereof. As used in the present disclosure, the subsystems and modules may be a part of and/or hosted by one or more computing devices, including server(s), personal computer(s), personal digital assistant(s), and/or any other processor containing apparatus. Various subsystems and modules may perform differing functions and/or roles and together may remain a single unit, program, device, and/or system.

Figure 1:
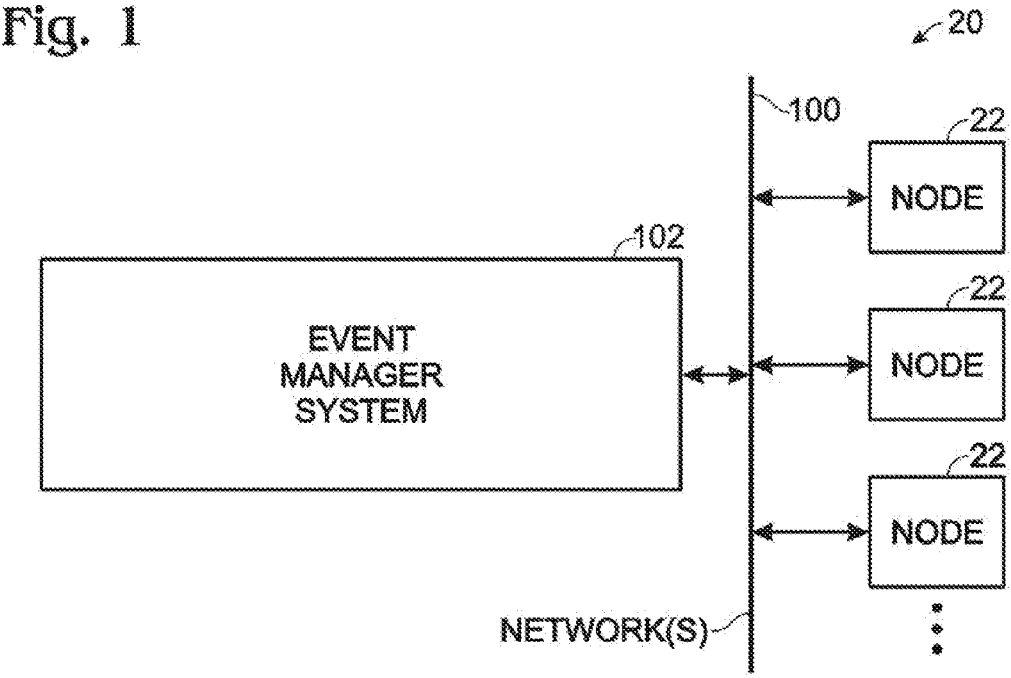
FIG. 1 is a block diagram of a virtual collaboration system in accordance with an embodiment of the disclosure.

FIG. 1 shows a virtual collaboration system 20. The virtual collaboration system may include a plurality of nodes 22 connected to one or more communication networks 100, and a management subsystem or an event manager system 102. The event manager system may include any suitable structure used to provide and/or manage one or more collaborative "cross-connected" events among the nodes communicatively coupled to the event manager system via the one or more communication networks. Although virtual collaboration system 20 is shown to include event manager system 102, the virtual collaboration system may, in some embodiments, not include the event manager system, such as in a peer-to-peer virtual collaboration system. In those embodiments, one or more of nodes 22 may include component(s) and/or function(s) of the event manager system.

Figure 2:
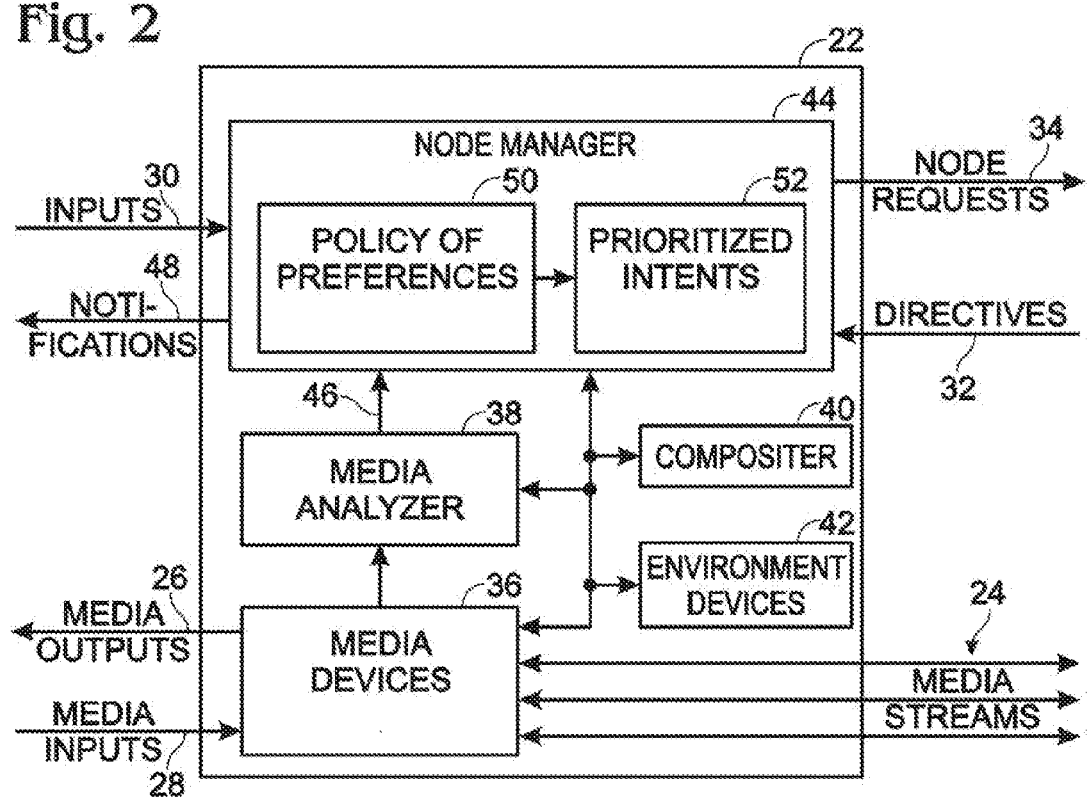
FIG. 2 is a block diagram of a node in accordance with an embodiment of the disclosure.

FIG. 2 shows components of a node 22, as well as connections of the node to event management system 102. As generally illustrated, node 22 is a system that may participate in a collaborative event by receiving, presenting, and/or transmitting media data. Accordingly, node 22 may be configured to receive from and/or transmit media information or media streams 24 to one or more other nodes 22, to generate local media outputs 26, to receive local media inputs 28, local attendee inputs 30, and/or system directives 32 from one or more other nodes 22 and/or the event manager system, and/or to transmit node requests 34 to one or more other nodes 22 and/or the event manager system. For example, node 22 may be configured to transmit one or more media streams 24 to one or more other nodes 22 and/or receive one or more media streams 24 from the one or more other nodes.

The media stream(s) may include content (or shared content) that may be modified by one or more of the nodes. The content may include any data modifiable by the one or more nodes. For example, content may include an electronic document, a video, a visual representation of an object, etc.

As shown, node 22 may include any suitable number of media devices 36, which may include any suitable structure configured to receive media streams 24, display and/or present the received media streams (such as media output 26), generate or form media streams 24 (such as from media inputs 28), and/or transmit the generated media streams. In some embodiments, media streams 24 may be received from and/or transmitted to one or more other nodes 22.

Media devices 36 may include any hardware and/or software element(s) capable of interfacing with one or more other nodes 22 and/or one or more networks 100. One or more of the media devices may be configured to receive media streams 24, and/or to reproduce and/or present the received media streams in a manner discernable to an attendee. For example, node 22 may be in the form of a laptop or desktop computer, which may include a camera, a video screen, a speaker, and a microphone as media devices 36. Alternatively, or additionally, the media devices may include microphone(s), camera(s), video screen(s), keyboard(s), scanner(s), motion sensor(s), and/or other input and/or output device(s).

Media devices 36 may include one or more video cameras configured to capture video of the user of the node, and to transmit media streams 24 including that captured video. Media devices 36 also may include one or more screens configured to display the shared content of the media stream to the user(s) of the node. Additionally, or alternatively, media devices 36 may include computer vision subsystems configured to capture one or more images, such as one or more three-dimensional images. For example, the computer vision subsystems may include one or more stereo cameras (such as arranged in stereo camera arrays), and/or one or more cameras with active depth sensors. Alternatively, or additionally, the computer vision subsystems may include one or more video cameras.

The computer vision subsystems may be configured to capture one or more images of the user(s) of the node. For example, the computer vision subsystems may be configured to capture images of the one or more gestures (such as hand gestures that may be adjacent a screen displaying the content of the media stream) of the user of the node. The images may be two or three-dimensional images.

The computer vision subsystems may be positioned to capture the images at any suitable location(s). For example, the computer vision subsystems may be positioned adjacent to a screen to capture images within one or more interaction regions spaced from a screen of the node, such as a region of space in front of the user(s) of the node. The computer vision subsystems may be positioned such that the screen of the nodes is not within the interaction region. Additionally, the computer vision subsystems may be positioned to capture the image of the gesture(s) without capturing the screen in that image, or without capturing more than a peripheral view of the screen in that image. "Peripheral view," as used herein regarding the computer vision subsystems, refers to a view in which the line of sight of a computer vision subsystem intersects the screen (or the plane of the screen) at an angle that is approximately 30 degrees or less, or preferably approximately 15 degrees or less, or even preferably approximately 10 degrees or less.

For example, the computer vision subsystems may be positioned along the same plane of the screen pointing toward the space between the screen and the user. Alternatively, or additionally, the computer vision subsystems may be positioned along a plane that is non-parallel to the plane of the screen (such as perpendicular or oblique to the plane of the screen) pointing toward the space between the screen and the user.

Node 22 also may include at least one media analyzer or media analyzer module 38, which may include any suitable structure configured to generate visual representations of output(s) from one or more of the media device(s). The media analyzer also may include any suitable structure configured to analyze those output(s) and identify any instructions or commands from those output(s). For example, media analyzer 38 may include one or more visual representation generators, media stream capture mechanisms, and one or more signal processors, which may be in the form of hardware and/or software/firmware.

Media analyzer 38 may be configured to generate at least one visual representation of the gesture(s) from the captured image(s) from one or more of the media devices, such as a visual representation of a user's hand pointing to a portion of displayed content. Any suitable visual representations may be generated. For example, the visual representation may be a video image of the gesture. Alternatively, or additionally, the visual representation may be a graphic that is shaped and/or sized similar to the identified gesture. For example, the graphic may be generated by extruding or using metaballs to simulate a solid object from one or more surfaces captured by the camera(s).

The media analyzer may generate visual representation(s) of the gesture(s) with any suitable orientation(s) or view(s). For example, the visual representation of a pointing gesture may be oriented to create a view of the gesture from the viewpoint of the remote user (which notionally would be on the other side of the screen). Thus, when the transmitted media stream is displayed at one or more other nodes 22, the visual representation of the user's hand is pointing to the user of those nodes. The visual representation generated by the media analyzer also may be generated or rendered in any suitable colors. For example, the visual representation may be rendered in natural colors, which may be depth mapped (such as rendering closer parts darker) or virtually re-lighted to help disambiguate shapes. Alternatively, or additionally, the visual representation may be a shadow and/or silhouette, which may distinguish the visual representation from the shared content.

The media analyzer also may be configured to determine the location of the gesture(s) with respect to the screen based on the captured image(s) from the camera(s), and/or provide information to the node manager regarding that determined location, such as in the form of media analyzer inputs 46. For example, when the gesture is a pointing gesture, the media analyzer may be configured to determine the location of the pointing gesture with respect to the screen based on the captured image(s) from the camera(s), and may generate information as to what portion of the content the user is pointing to with the pointing gesture. For example, if the content includes an electronic document and the user is using a pointing gesture to point at a particular word (or a particular letter of a word), the generated information may include that particular word (or a particular letter of a word) that is being pointed to. Additionally, if the content includes a visual representation of an object, such as a cube, and the user is pointing to a particular corner of the cube, the generated information may include that particular corner that is being pointed to.

Additionally, when the gesture is a framing gesture, the media analyzer may be configured to determine the location of the framing gesture with respect to the screen based on the captured image(s) from the camera(s), and may generate information on the determined location. That information may include what portion of the content the user is framing with the framing gesture. For example, if the content is a picture and the user is framing any percentage of that picture (e.g., 5%, 1%, 0.5%, 0.1%, 0.01%, etc.), the generated information includes the portion of the picture framed by the framing gesture.

The media analyzer also may be configured to identify one or more gestures from the captured image(s) from one or more of the media devices. Any suitable gestures, including one or two-hand gestures (such as hand gestures that do not involve manipulation of any peripheral devices), may be identified by the media analyzer. For example, a pointing gesture, which may be performed by a user extending his or her pointing finger, may be identified to indicate that the user wants to point at or highlight one or more portions of the displayed content. The user's hand may be spaced from the screen when the pointing gesture is made or may touch the screen. Other gestures may additionally, or alternatively, be identified by the media analyzer, including reaching gestures, locking gestures, turning gestures, etc.

The media analyzer may include any suitable software and/or hardware/firmware. For example, the media analyzer may include, among other structure, visual recognition software and a relational database. The visual recognition software may use a logical process for identifying the gesture(s). For example, the visual recognition software may separate the user's gestures from the background. Additionally, the software may focus on the user's hands (such as hand pose, hand movement, and/or orientation of the hand) and/or other relevant parts of the user's body in the captured image. The visual recognition software also may use any suitable algorithm(s), including algorithms that process pixel data, block motion vectors, etc.

The relational database may store recognized gestures and visual representations of those gestures as inputs to a node manager and/or compositer, as further discussed below. The relational database may be configured to store additional recognized gestures learned during operation of the media analyzer. Alternatively, or additionally, the media analyzer may generate a new visual representation when a gesture is captured and/or identified. The media analyzer may be configured to generate visual representations for any suitable number of gestures. Examples of media analyzers include gesture control products from GestureTek®, such as Gest-Point®, GestureXtreme®, and GestureTek Mobile™, natural interface products from Softkinetic, such as iisu™ middleware, and gesture-based control products from Mgestyk Technologies, such as the Mgestyk Kit.

The computer vision subsystems and/or media analyzer may be activated in any suitable way(s) during operation of node 22. For example, the computer vision subsystems and/or media analyzer may be activated by a user placing something within the interaction region of the computer vision system, such as the user's hands. Although media analyzer 38 is shown to be configured to generate visual representations of gesture(s) at local node 22, the media analyzer may additionally, or alternatively, be configured to generate visual representation of gesture(s) from other nodes 22. For example, images of one or more gestures from a user of a remote node may be transmitted to local node 22 and analyzed by media analyzer 38 for the addition of a visual representation of the gesture to the shared content.

Node 22 also may include at least one compositer or compositer module 40, which may include any suitable structure configured to composite two or more media streams from the media devices. In some embodiments, the compositer may be configured to composite captured video of the user of the node with other content in one or more media streams 24. The compositing of the content and the video may occur at the transmitting node and/or the receiving node(s). Additionally, or alternatively, the compositer may composite or add visual representation(s) of the gesture(s) from the media analyzer with the shared content.

Node 22 also may include one or more environment devices 42, which may include any suitable structure configured to adjust the environment of the node and/or support one or more functions of one or more other nodes 22. The environment devices may include participation capabilities not directly related to media stream connections. For example, environment devices 42 may change zoom setting(s) of one or more cameras, control one or more video projectors (such as active, projected content back onto the user and/or the scene), change volume, treble, and/or bass settings of the audio system, and/or adjust lighting.

As shown in FIG. 2, node 22 also may include a node manager 44, which is may include any suitable structure adapted to process attendee input(s) 30, system directive(s) 32, and/or media analyzer input(s) 46, and to configure one or more of the various media devices 36 and/or compositer 40 based, at least in part, on the received directives and/or received media analyzer inputs. The node manager may interpret inputs and/or directives received from the media analyzer, one or more other nodes 22, and/or event manager system and may generate, for example, device-specific directives for media devices 36, compositer 40, and/or environment devices 42 based, at least in part, on the received directives.

For example, node manager 44 may be configured to receive media analyzer inputs 46 regarding the portion of the displayed content that the user's hand is pointing to. The node manager may send instructions and/or directives to the compositer so that it composites the visual representation of the user's hand with the content of the transmitted media stream such that, when the transmitted media stream is displayed at one or more other nodes 22, the visual representation of the user's hand is pointing to the same portion of the content displayed at those nodes and, in some embodiments, to the user(s) of those nodes. The node manager may send multiple instructions to the compositer if there are multiple content and/or multiple visual representations of the user's hand.

Additionally, or alternatively, the node manager may be configured to receive instructions from one or more other nodes 22 that may be used by the node manager to direct the media analyzer to generate a visual representation of a captured gesture from one or more other nodes 22, and/or direct the compositer so that it composites the visual representation of the captured gesture with the content of the received media stream such that, when the received media stream is displayed at the node, the visual representation of the hand of the user from another node is pointing to the portion of the content displayed at the node and, in some embodiments, to the user of the node.

Although node 22 has been shown and discussed to be able to generate visual representations of one or more gestures and/or recognize those gestures, the node may additionally, or alternatively, be configured to recognize other user inputs, such as physical objects that may be placed (or held) within the interaction region of the computer vision system. For example, a three-dimensional object may be placed within the interaction region for a few seconds. The node may generate a visual representation of the object, even after the object has been removed from the interaction region, and then composite that visual representation with the content and/or other video of the transmitted media stream.

Figure 3:
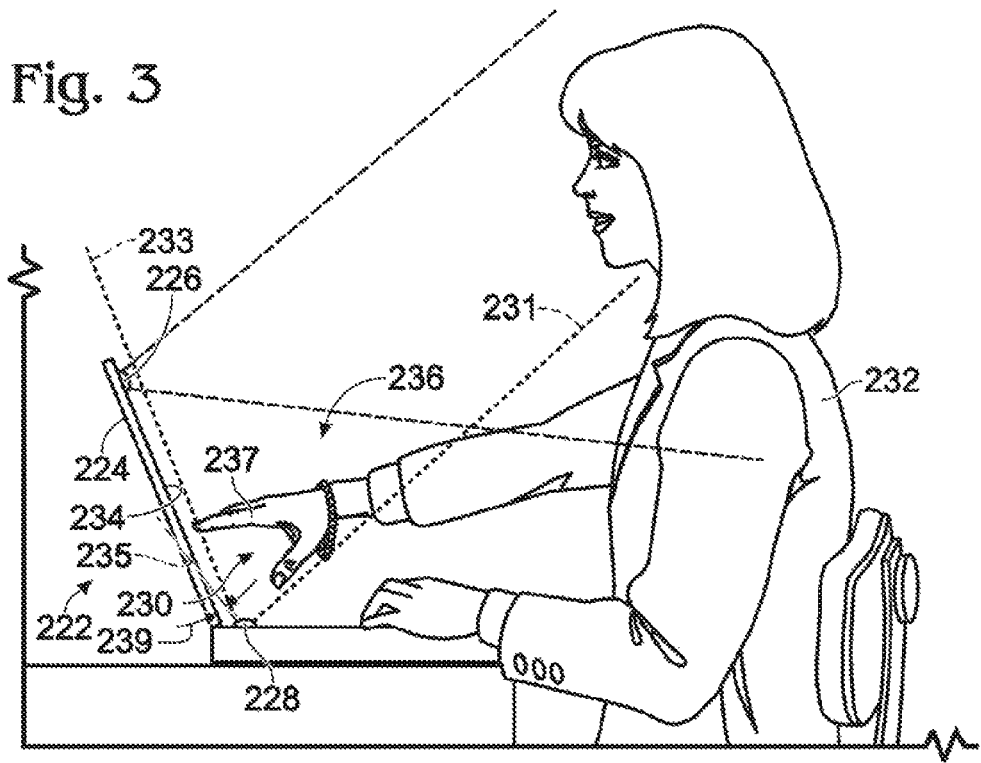
FIG. 3 is an exemplary first node and a first user gesturing at a portion of shared content at the first node in accordance with an embodiment of the disclosure.

An example of node 22 is shown in FIG. 3 and is generally indicated at 222. Unless otherwise specified, node 222 may have at least some of the function(s) and/or component(s) of node 22. Node 222 is in the form of a laptop computer that includes, among other media devices, at least one screen 224 and cameras 226 and 228. Displayed on the screen is shared content 234. Camera 226 is configured to capture image(s) of a first user 232. Camera 228 is configured to captures image(s) of first user 232 within an interaction region 230, the interaction region defined by dashed lines 231 and 233. That camera is in a plane oblique to the plane of screen 224 and is positioned to capture images of the gesture(s) without capturing an image that is on the screen. Thus, screen 224 is not within interaction region 230. First user 232 is shown in FIG. 3 making gestures 236 (such as pointing gesture 237) within interaction region 230.

Figure 4:
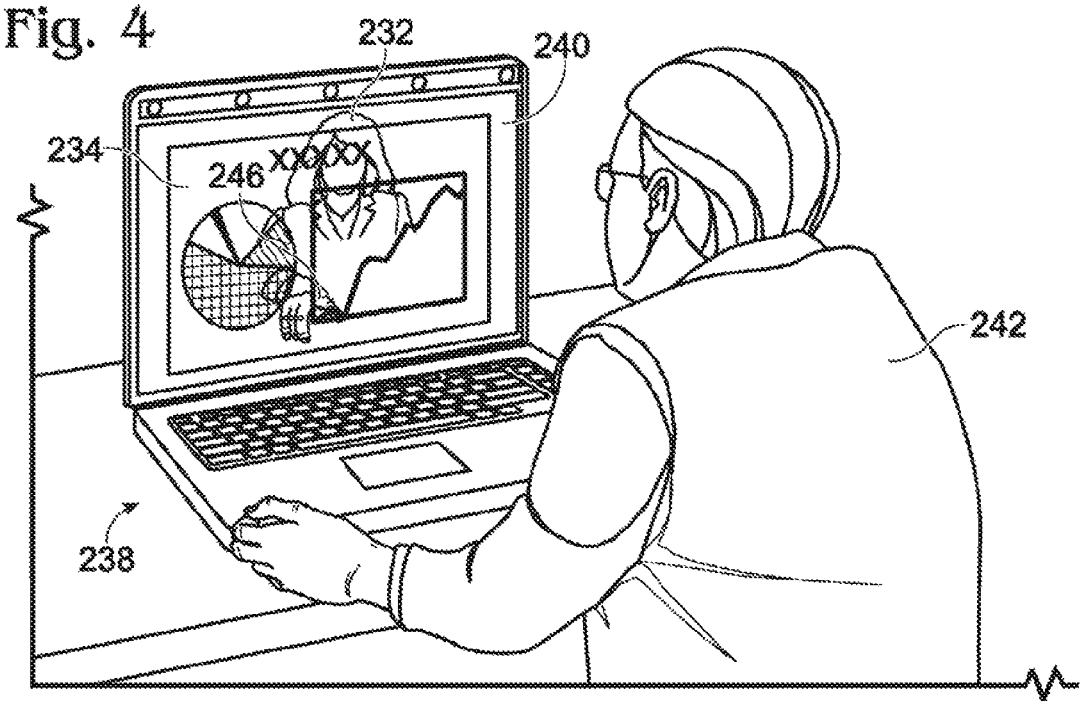
FIG. 4 is an exemplary second node and a second user viewing the first user, the shared content, and a visual representation of the gesture of the first user toward the portion of the shared content in FIG. 3 in accordance with an embodiment of the disclosure.
Figure 5:
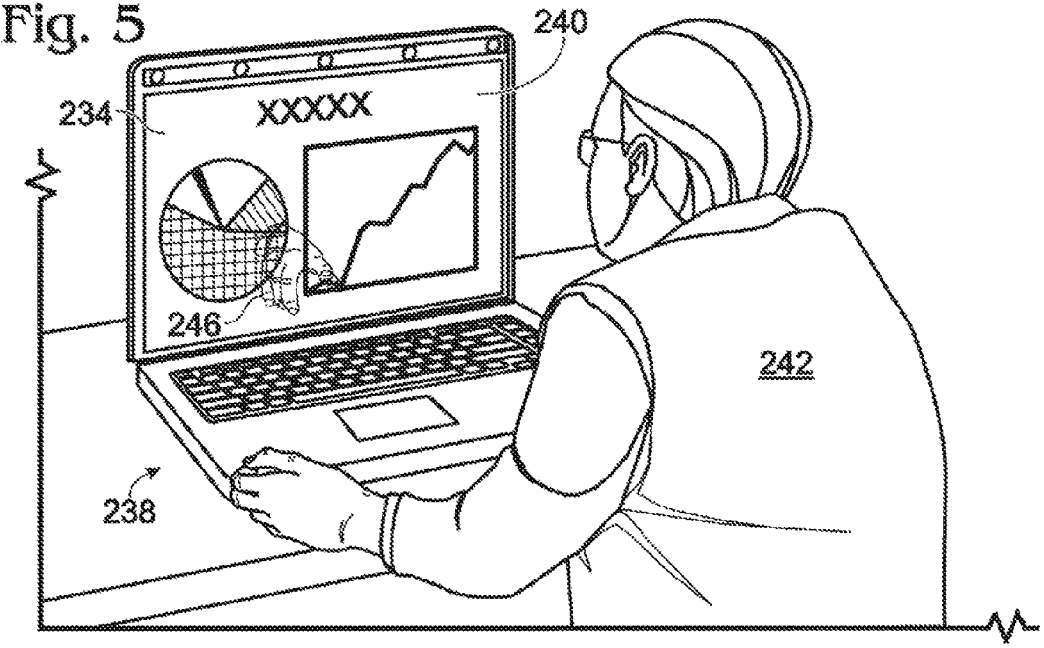
FIG. 5 is another exemplary second node and a second user viewing the shared content and a visual representation of the gesture of the first user toward the portion of the shared content in FIG. 3 in accordance with an embodiment of the disclosure.

Another example of node 22 is shown in FIG. 4 and is generally indicated at 238. Unless otherwise specified, node 238 may have at least some of the function(s) and/or component(s) of nodes 22 and 222. Node 238 is in the form of a laptop computer being used by a second user 242. The laptop computer includes, among other media devices, at least one screen 240. On screen 240, a video of first user 232 and shared content 234 are shown. Additionally, a visual representation 246 of the first user's pointing gesture is shown to indicate to second user 242 where first user 232 in FIG. 3 is pointing to. Although FIG. 4 shows video of first user 232, shared content 234, and visual representation 246, node 238 may show on screen 240 only shared content 234 and visual representation 246, as shown in FIG. 5.

Although specific gestures are shown, node 222 may be configured to generate visual representations of other gestures. Additionally, although node 222 is shown to include a screen displaying a single user at a different node with the shared content, the screen may display multiple users at one or more different nodes with the shared content. Furthermore, although node 222 is shown to include a single screen, the node may include multiple screens with some of the screens displaying users from one or more different nodes and the shared content.

Additionally, although a single visual representation of a hand gesture pointing to a single shared content is shown, there may be multiple visual representations pointing to different portions of a single shared content, and/or there may be multiple shared content (whether on a single screen or on multiple screens) with some of the shared content including the visual representations. Moreover, although camera 228 is shown to be positioned to capture images of the gesture(s) without capturing an image that is on the screen, camera 228 may be positioned to capture images of the gesture(s) with no more than a peripheral view of the image that is on the screen. For example, camera 228 may alternatively have an interaction region defined by a dashed-dot line 235 and dashed line 231 (or dashed-dot line 235 and dashed line 233), as shown in FIG. 4. The dashed-dot line may intersect the screen at an intersection angle 239 that is 30 degrees or less such that the camera has no more than a peripheral view of the screen.

Figure 6:
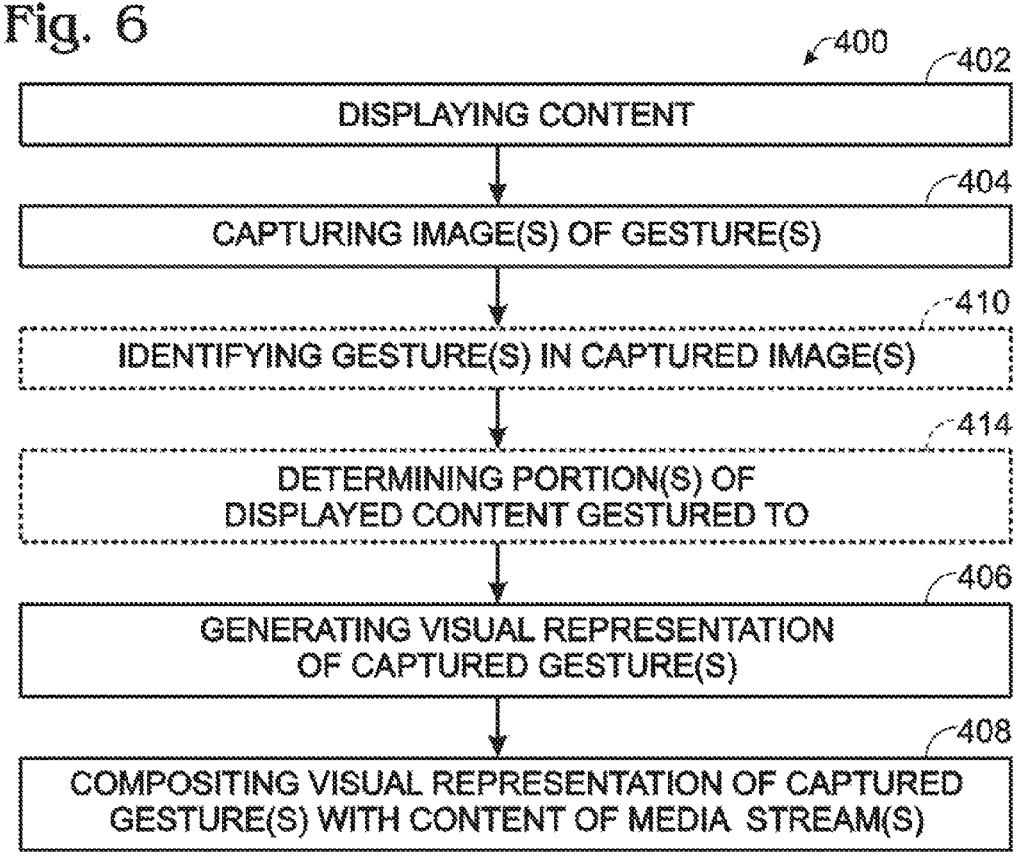
FIG. 6 is a flow chart showing a method of visually indicating one or more gestures of a user of a node in the content of a media stream in accordance with an embodiment of the disclosure.

FIG. 6 shows an example of a method, which is generally indicated at 400, of visually indicating a user gesture of a node in the content of a media stream. While FIG. 6 shows illustrative steps of a method according to one example, other examples may omit, add to, and/or modify any of the steps shown in FIG. 6.

As illustrated in FIG. 6, the method may include displaying content of the media stream at 402. The method also may include capturing an image of the user gesture of the user of the node at 404. The user gesture may be adjacent to the displayed content and/or the image may be free from more than a peripheral view of the displayed content. A visual representation of the captured user gesture may be generated, such as by the media analyzer, at 406. The visual representation of the captured user gesture may be composited with the content of the media stream at 408.

In some embodiments, method 400 may include identifying or recognizing the user gesture in the captured image at 410 and/or determining portion(s) of that displayed content that the user is gesturing to at 414. For example, when the user gesture is a pointing gesture directed at portion(s) of the content, the visual representation generated may include a visual representation of the user's hand pointing to those portion(s), which may be a silhouette or video image of the user's hand. Compositing may include compositing that visual representation with the content of the media stream such that, when the transmitted media stream is displayed at the other node(s), the visual representation is pointing to the portion of the content displayed at those node(s) and/or to the user of those nodes.

Node 22 also may include computer-readable media comprising computer-executable instructions for visually indicating a user gesture of a node in the content of a media stream, the computer-executable instructions being configured to perform one or more steps of method 400 discussed above.

What is claimed is:

1. A node 22 to transmit a media stream 24 having content to one or more other nodes 22, comprising:
    a screen to display the content of the media stream 24 to a user of the node positioned opposite the screen;
    a media device 36 pointing in a direction outwards from the screen towards the user and to capture an image of one or more gestures of the user of the node 22, wherein the one or more gestures are adjacent to and in front of the screen, and the media device 36 is positioned to capture the image without capturing more than a peripheral view of the screen in that image;
    a media analyzer 38 to generate a visual representation of the captured one or more gestures, the visual representation being a non-video image graphic that is one or more of shaped and sized in accordance with the one or more gestures; and
    a compositer 40 to composite the visual representation of the captured one or more gestures with the content of the media stream 24, such that the visual representation of the captured one or more gestures appears to have been made behind the screen even though the one or more gestures were made in front of the screen.

2. The node 22 of claim 1, wherein the one or more gestures includes a user's hand pointing to a portion of the displayed content, and the visual representation includes a visual representation of the user's hand pointing to a portion of the displayed content.

3. The node 22 of claim 2, wherein the user's hand is spaced from the screen when the user's hand is pointing to a portion of the displayed content.

4. The node 22 of claim 2, wherein the media analyzer 38 is further to determine the portion of the displayed content that the user's hand is pointing to, and wherein the compositer 40 is to composite the visual representation of the user's hand with the content of the media stream 24 such that, when the media stream 24 is displayed at one or more other nodes 22, the visual representation of the user's hand is pointing to the portion of the content displayed at the one or more other nodes 22.

5. The node 22 of claim 4, wherein the visual representation of the user's hand pointing to a portion of the displayed content is oriented such that, when the media stream 24 is displayed at the one or more other nodes 22, the visual representation of the user's hand is pointing to the portion of the content displayed at the one or more other nodes 22 and to the user of the one or more other nodes 22.

6. The node 22 of claim 4, wherein the content includes an electronic document having a plurality of words, and the portion of the content is a particular word of the plurality of words.

7. The node of 22 claim 2, wherein the visual representation of the user's hand pointing to a portion of the displayed content includes a video image of the user's hand.

8. The node 22 of claim 1, wherein the media stream 24 includes video of the user of the node 22 and the content composited within the video of the user of the node, wherein the compositer 40 is further to add the visual representation of the user pointing to a portion of the displayed content with the video of the user of the node and the content.

9. A method 400 of visually indicating a user gesture of a node 22 in the content of a media stream 24, comprising:
displaying 402 the content of the media stream on a screen positioned opposite a user of the node;
capturing 404 an image of the user gesture of the node made in front of the screen, by a media device pointing in a direction outwards from the screen towards the user 22, the user gesture being adjacent to the displayed content and the image being free from more than a peripheral view of the displayed content;
generating 406 a visual representation of the captured user gesture, the visual representation being a non-video image graphic that is one or more of shaped and sized in accordance with the gesture; and
compositing 408 the visual representation of the captured user gesture with the content of the media stream 24, such that the visual representation of the gesture appears to have been made behind the screen even though the gesture was made in front of the screen.

10. The method 400 of claim 9, wherein the user gesture includes a hand of the user pointing to a portion of the displayed content 402, and further comprising determining 414 the portion of the displayed content that the hand of the user is pointing to, wherein generating 406 a visual representation includes generating 406 a visual representation of the hand of the user pointing to a portion of the displayed Content 402.

11. The method 400 of claim 10, wherein compositing 408 the visual representation includes compositing 408 the visual representation of the hand of the user pointing to a portion of the displayed content 402 with the content of the media stream 24 such that, when the media stream 24 is displayed at one or more other nodes 22, the visual representation of the user's hand is pointing to the portion of the content displayed at the one or more other nodes 22.

12. The method 400 of claim 11, wherein generating 406 a visual representation includes generating 406 a visual representation of the hand of the user such that, when the media stream 24 is displayed at the one or more other nodes 22, the visual representation of the user's hand is pointing to the portion of the content displayed at the one or more other nodes 22 and to the user of the one or more other nodes 22.

13. The method 400 of claim 10, wherein generating 406 a visual representation of the hand of the user includes generating 406 a silhouette of the user's hand.

14. Non-transitory computer-readable media comprising computer-executable instructions for visually indicating a user gesture of a node 22 in the content of a media stream 24, the computer-executable instructions to:
display 402 the content of the media stream on a screen positioned opposite a user of the node,
capture 404 an image of the user gesture of the node made in front of the screen, by a media device pointing in a direction outwards from the screen towards the user 22, the user gesture being adjacent to the displayed content and the image being free from more than a peripheral view of the displayed content;
generate 406 a visual representation of the captured user gesture, the visual representation being a non-video image graphic that is one or more of shaped and sized in accordance with the gesture;
and composite 408 the visual representation of the captured user gesture with the content, such that the visual representation of the gesture appears to have been made behind the screen even though the gesture was made in front of the screen.

15. The non-transitory computer-readable media of claim 14, wherein the user gesture including a hand of the user pointing to a portion of the displayed content and the computer-executable instructions are further to determine 414 the portion of the displayed content that the hand of the user is pointing to, wherein generating a visual representation includes generating a visual representation of the hand of the user pointing to a portion of the displayed content.

\* \* \* \* \*

UNITED STATES PATENT AND TRADEMARK OFFICE
CERTIFICATE OF CORRECTION

| | | |
|---|---|---|
| PATENT NO. | : 8,902,280 B2 | Page 1 of 1 |
| APPLICATION NO. | : 13/259762 | |
| DATED | : December 2, 2014 | |
| INVENTOR(S) | : Ian N. Robinson et al. | |

It is certified that error appears in the above-identified patent and that said Letters Patent is hereby corrected as shown below:

In the Claims

In column 9, line 32 approx., in Claim 10, delete "Content" and insert -- content --, therefor.

Signed and Sealed this
Nineteenth Day of May, 2015

Michelle K. Lee
*Director of the United States Patent and Trademark Office*